United States Patent
Lee et al.

(10) Patent No.: US 9,665,260 B2
(45) Date of Patent: May 30, 2017

(54) METHOD AND APPARATUS FOR CONTROLLING SCREEN OF MOBILE DEVICE

(71) Applicant: Samsung Electronics Co., Ltd., Suwon-si, Gyeonggi-do (KR)

(72) Inventors: Yohan Lee, Seongnam-si (KR); Jaebong Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/476,156

(22) Filed: Sep. 3, 2014

(65) Prior Publication Data

US 2015/0062002 A1 Mar. 5, 2015

(30) Foreign Application Priority Data

Sep. 3, 2013 (KR) ........................ 10-2013-0105238

(51) Int. Cl.
*G09G 5/00* (2006.01)
*G06F 3/0484* (2013.01)
*G06F 3/03* (2006.01)

(52) U.S. Cl.
CPC ........ *G06F 3/04845* (2013.01); *G06F 3/0304* (2013.01)

(58) Field of Classification Search
CPC ........... G06F 3/04883; B64C 2201/123; B64C 2201/127; B64C 2201/146; B64C 39/024; G05D 1/0094; G05D 1/0016
USPC .... 345/156–173, 207, 419, 633; 348/36, 77; 463/36, 63; 455/456.3, 566; 701/2
See application file for complete search history.

(56) References Cited

U.S. PATENT DOCUMENTS

| | | | |
|---|---|---|---|
| 2005/0128286 A1* | 6/2005 | Richards | G06F 3/04815 348/36 |
| 2007/0067745 A1* | 3/2007 | Choi | G06F 3/0317 715/863 |
| 2007/0146325 A1* | 6/2007 | Poston | G06F 3/0317 345/163 |
| 2008/0246830 A1* | 10/2008 | Martin | H04N 5/23203 348/14.02 |
| 2009/0268095 A1* | 10/2009 | Hoshino | H04N 5/74 348/607 |
| 2010/0124941 A1* | 5/2010 | Cho | H04M 1/72544 455/556.1 |
| 2011/0063469 A1* | 3/2011 | Omi | H04N 5/23293 348/222.1 |
| 2012/0068927 A1* | 3/2012 | Poston | G06F 3/0317 345/163 |

(Continued)

FOREIGN PATENT DOCUMENTS

KR 10-2012-0001941 A 1/2012

*Primary Examiner* — Prabodh M Dharia
(74) *Attorney, Agent, or Firm* — Jefferson IP Law, LLP

(57) ABSTRACT

A method and an apparatus for controlling a screen of a mobile device are provided. The method includes detecting an object from an image captured through an image sensor, detecting movement of a location of the object to move a location of the screen, and moving and displaying the screen according to the detected movement of the location of the object. According to the present disclosure, a screen can be moved and displayed according to movement of an object detected from an image captured by an image sensor. Accordingly, users can easily operate mobile devices of various sizes only with one hand.

13 Claims, 13 Drawing Sheets

(56) References Cited

U.S. PATENT DOCUMENTS

| | | | |
|---|---|---|---|
| 2012/0113267 A1* | 5/2012 | Ishige | H04N 5/145 348/169 |
| 2012/0120316 A1* | 5/2012 | Lee | H04N 21/42204 348/564 |
| 2012/0159615 A1* | 6/2012 | Griffin | H04L 9/3226 726/19 |
| 2012/0229510 A1* | 9/2012 | Hayashi | A63F 13/20 345/633 |
| 2012/0249440 A1* | 10/2012 | Yi | G06F 3/04883 345/173 |
| 2012/0320035 A1* | 12/2012 | Kim | H04N 13/0022 345/419 |
| 2013/0057536 A1* | 3/2013 | Li | G06T 13/20 345/419 |
| 2013/0162683 A1* | 6/2013 | Paretti | G06T 3/60 345/650 |
| 2013/0187835 A1* | 7/2013 | Vaught | G06K 9/00604 345/8 |
| 2014/0098139 A1* | 4/2014 | Matsunaga | G09G 5/34 345/651 |
| 2014/0354540 A1* | 12/2014 | Barazi | G06F 3/0416 345/156 |
| 2014/0354690 A1* | 12/2014 | Walters | G06T 19/006 345/633 |
| 2015/0029304 A1* | 1/2015 | Park | H04N 5/23238 348/36 |
| 2015/0054930 A1* | 2/2015 | Bangera | G06K 9/00134 348/77 |
| 2015/0054944 A1* | 2/2015 | Bangera | A61B 5/443 348/135 |
| 2015/0135093 A1* | 5/2015 | Zhou | G06F 3/0488 715/748 |
| 2015/0220258 A1* | 8/2015 | Mikami | G06F 3/0485 715/798 |
| 2015/0268666 A1* | 9/2015 | Wang | B64C 19/00 701/2 |
| 2016/0117075 A1* | 4/2016 | Stankovic | G06F 3/0488 345/173 |

* cited by examiner

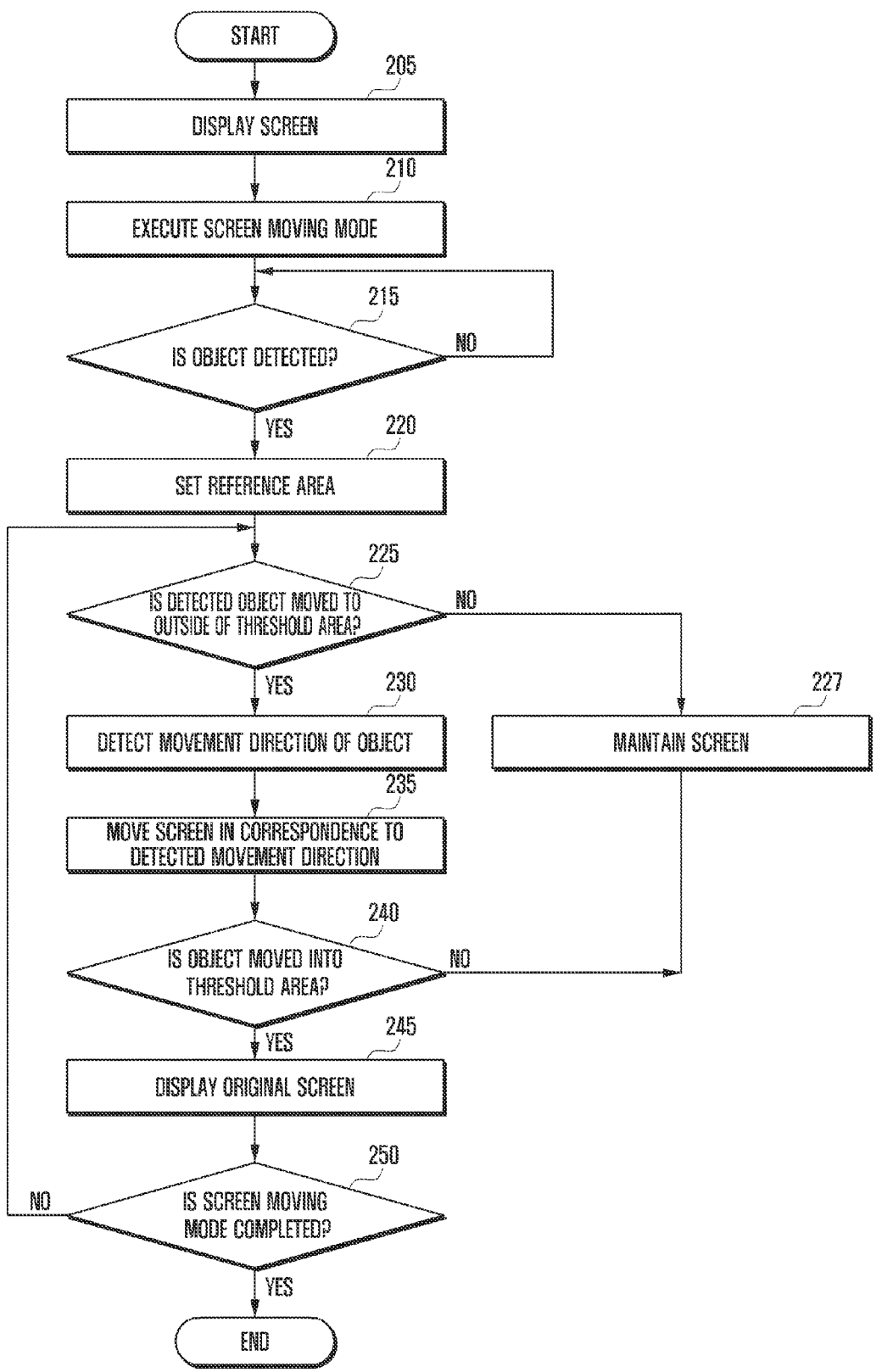

FIG. 3A
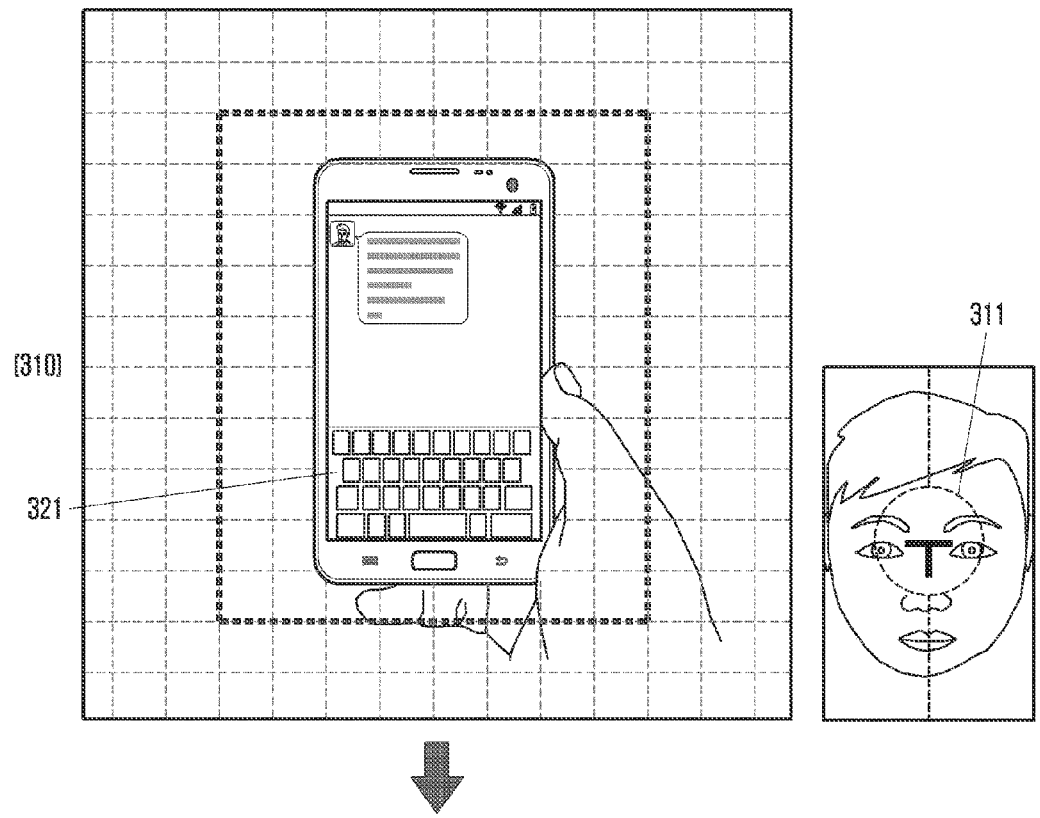
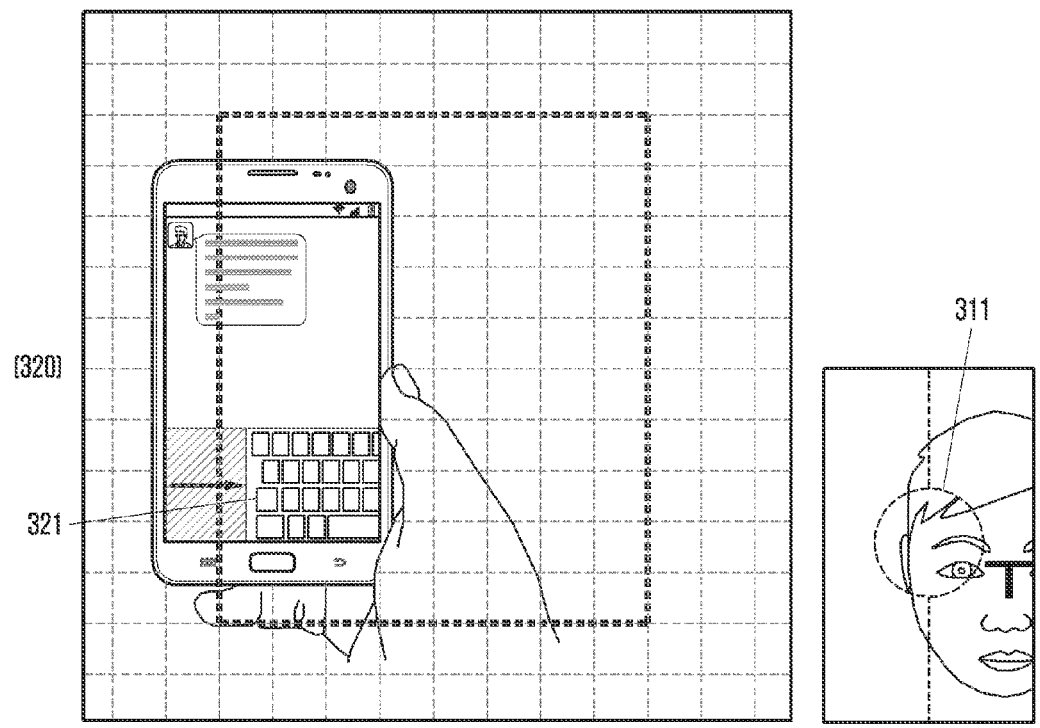

FIG. 7A
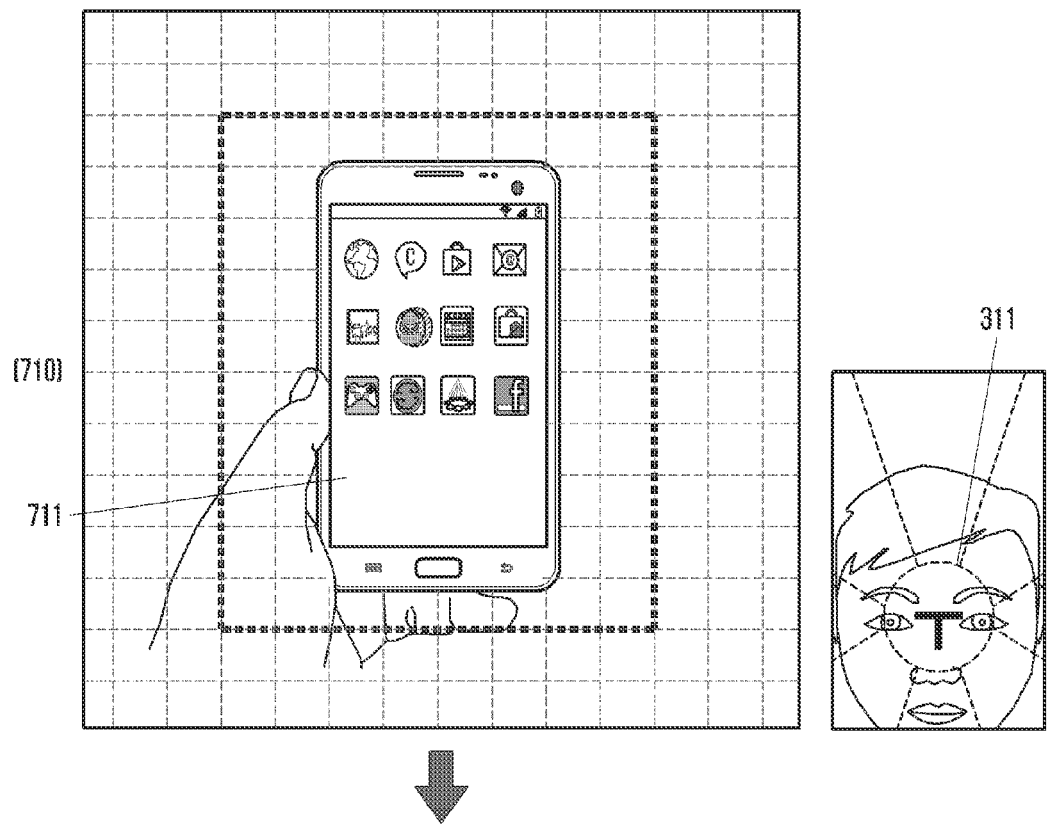
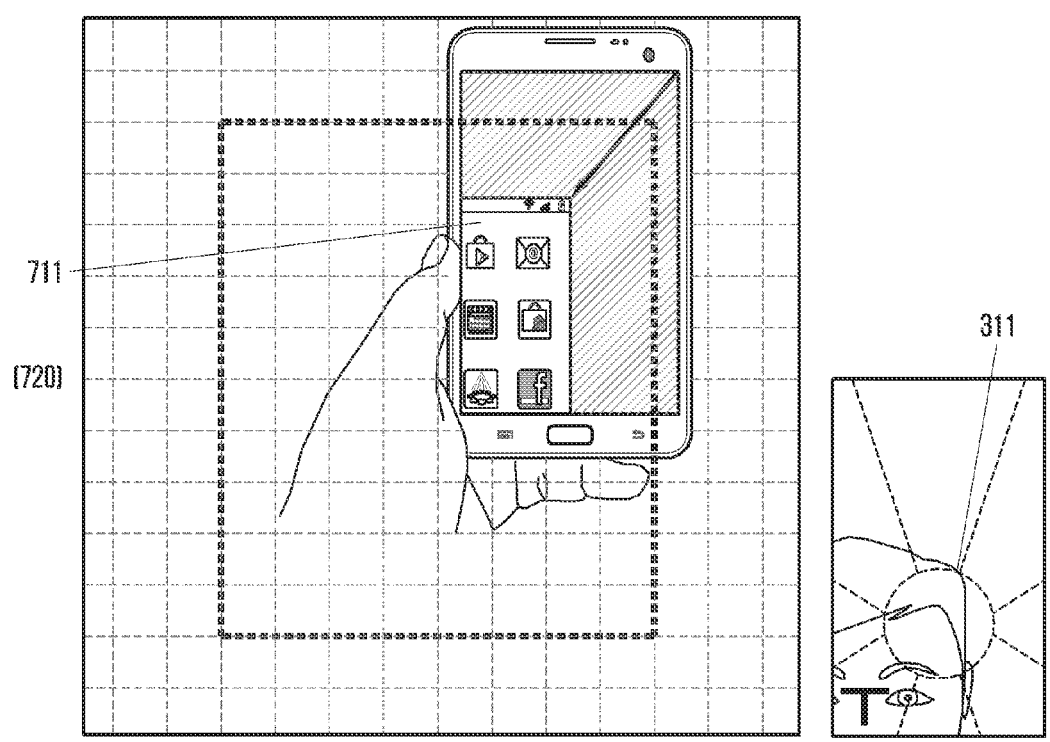

METHOD AND APPARATUS FOR CONTROLLING SCREEN OF MOBILE DEVICE

CROSS-REFERENCE TO RELATED APPLICATION(S)

This application claims the benefit under 35 U.S.C. §119(a) of a Korean patent application filed on Sep. 3, 2013 in the Korean Intellectual Property Office and assigned Serial number 10-2013-0105238, the entire disclosure of which is hereby incorporated by reference.

TECHNICAL FIELD

The present disclosure relates to a method and an apparatus for controlling a screen of a mobile device.

BACKGROUND

Recently, with the development of digital technologies, various electronic devices (e.g., a mobile communication terminal, a Personal Digital Assistant (PDA), an electronic organizer, a smart phone, a tablet Personal Computer (PC), and the like) which can perform communication and personal information processing have come to market. Consistent with the trend of mobile convergence, the electronic devices have evolved to provide functions beyond their original communication functions. For example, the electronic devices may be provided with various functions including a call function such as a voice call and a video call, a message transmission/reception function such as a Short Message Service (SMS), a Multimedia Message Service (MMS), and an e-mail, a navigation function, a photography function, a broadcast reproduction function, a media (e.g., a video and music) reproduction function, an interne function, a messenger function, a Social Networking Service (SNS) function, and the like. As various activities become possible by using an electronic device, users come to prefer devices provided with a large screen to maximize the usefulness of performing various functions. Electronic devices have recently become larger, reflecting the preferences of users, and the sizes and shapes thereof have also become diversified.

In recent years, various types of electronic devices with large screens have appeared. However, the electronic devices of various sizes cannot be easily gripped and manipulated by one hand.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of easily manipulating an electronic such as a mobile device with one hand.

In accordance with an aspect of the present disclosure, a method of controlling a screen of a mobile device is provided. The method includes detecting an object from an image captured through an image sensor, detecting movement of a location of the object to move a location of the screen, and moving and displaying the screen according to the detected movement of the location of the object.

In accordance with another aspect of the present disclosure, an apparatus for controlling a screen of a mobile device is provided. The apparatus includes an image sensor configured to capture an object, a display configured to display the screen, and a controller configured to detect an object from the captured image, to detect movement of a location of the object, and to control to move and display the screen according to the detected movement of the location of the object.

According to the present disclosure, a screen can be moved and displayed according to movement of an object detected from an image captured by an image sensor. Accordingly, users can easily operate mobile devices of various sizes only with one hand.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other objects, features, and advantages of certain embodiments of the present disclosure will be more apparent from the following description in conjunction with the accompanying drawings, in which:

FIG. 2 is a flowchart showing a screen control operation according to an embodiment of the present disclosure;

FIGS. 3A, 3B, and 3C are views showing a method of setting a reference area according to an embodiment of the present disclosure;

FIGS. 7A and 7B show movement of a home screen according to an embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Meanwhile, various embodiments of the present disclosure shown and described in this specification and the drawings correspond to specific examples presented in order to easily explain technical contents of the present disclosure, and to help comprehension of the present disclosure, but are not intended to limit the scope of the present disclosure. It will be apparent to those having ordinary knowledge in the technical field, to which the present disclosure pertains, that it is possible to practice other modified various embodiments based on the technical idea of the present disclosure as well as the various embodiments disclosed herein.

Figure 1:
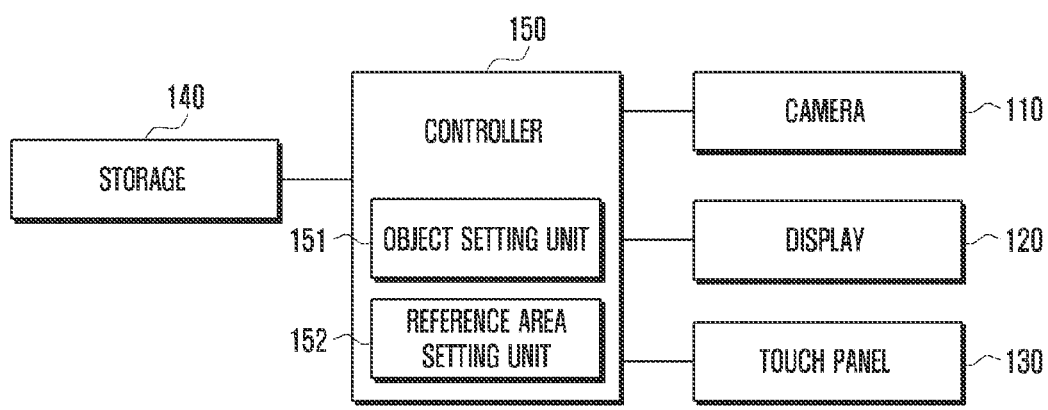
FIG. 1 is a block diagram schematically showing a configuration of a mobile device according to an embodiment of the present disclosure.

FIG. 1 is a block diagram schematically showing a configuration of a mobile device according to an embodiment of the present disclosure.

Referring to FIG. 1, the mobile device according to the embodiment of the present disclosure may include a camera 110, a display 120, a touch panel 130, a storage 140, a controller 150, and other similar and/or suitable components. The controller 150 may include an object setting unit 151, a reference area setting unit 152, and other similar and/or suitable units.

The camera 110 may convert received light into an electrical signal. The camera 110 may process low data into a preview image to transmit the processed preview image to the controller 150. The camera 110 may be referred to as an image sensor.

An operation of the camera 110 according to the embodiment of the present disclosure may be controlled according to execution of a screen movement mode. For example, when a screen moving mode is not executed, the camera 110 does not perform a photographing function, and when the screen moving mode is executed, the camera 110 may perform a photographing function.

The display 120 according to the present disclosure may include a Liquid Crystal Display (LCD), Organic Light Emitting Diodes (OLEDs), and Active Matrix Light Emitting Diodes (AMOLEDs), and visually provides various information such as a menu, input data, and function setting information of a mobile device to a user. When movement of a specific object detected by the camera 110 occurs in the screen moving mode, the display 120 according to the embodiment of the present disclosure may move and display a webpage, an application execution screen, and a home screen under the control of the controller 150. For example, when the user on the front side of the mobile device moves a location of his or her face, the display 120 may move an executed screen (for example, a webpage) to a location corresponding to a side to which the face of the user is moved and display the screen.

The touch panel 130 is a device for detecting a touch input of the user. The touch sensor 130 may be driven through methods such as a capacitive overlay method, a resistive overlay method, and an infrared beam method. The touch panel 130 may be formed in all kinds of methods by which a contact or a pressure of an object can be detected, in addition to the methods. The touch panel 130 may forward an electrical signal generated in response to a user gesture for the touch panel 130 to the controller 150.

The touch panel 130 according to the embodiment of the present disclosure may receive a touch input of the user in a specific screen area (for example, a keypad display area) to which the location is moved to generate an electrical signal, and may forward the electrical signal to the controller 150.

The storage 140 serves to store programs and data used for an operation of the mobile device. The storage 140 according to the embodiment of the present disclosure may store application programs by which the screen moving mode may be executed. For example, the storage 140 may store an instruction for driving the camera 110 after entering the screen moving mode, an instruction for setting a specific object in an image photographed by the camera 110, and an instruction for executing movement of the screen according to movement of the object. The storage 140 may store setting information on a reference coordinate including a threshold area.

The controller 150 controls an overall operation of the mobile device. The controller 150 may include an object setting unit 151 and a reference area setting unit 152. The controller 150 according to the embodiment of the present disclosure may execute a screen moving mode for controlling a location of the screen as a specific object photographed by the camera 110 is moved. The object setting unit 151 may perform a series of processes of setting a specific object which acts as a reference from an image photographed by the camera 110 in the screen moving mode. The reference area setting unit 152 may set a reference area based on a set location of the object. The reference area may include a threshold area which acts as a reference for determining movement of the object, and a division area which acts as a reference for recognition of a movement direction and a moved location of the object.

The controller 150 may determine whether the specific object set through the object setting unit 151 is moved to the outside of a threshold area. When the specific object is moved to the outside of the threshold area, the controller 150 may determine a division area corresponding to the moved location coordinate. Accordingly, the controller 150 may detect movement and a movement direction of the object, and may move a location of a screen (for example, a webpage, an application execution screen, and a home screen) which is being displayed according to the detected direction to display the screen.

Hereinafter, a screen control operation according to the embodiment of the present disclosure will be described with reference to FIGS. 2 to 6.

Figure 3B:
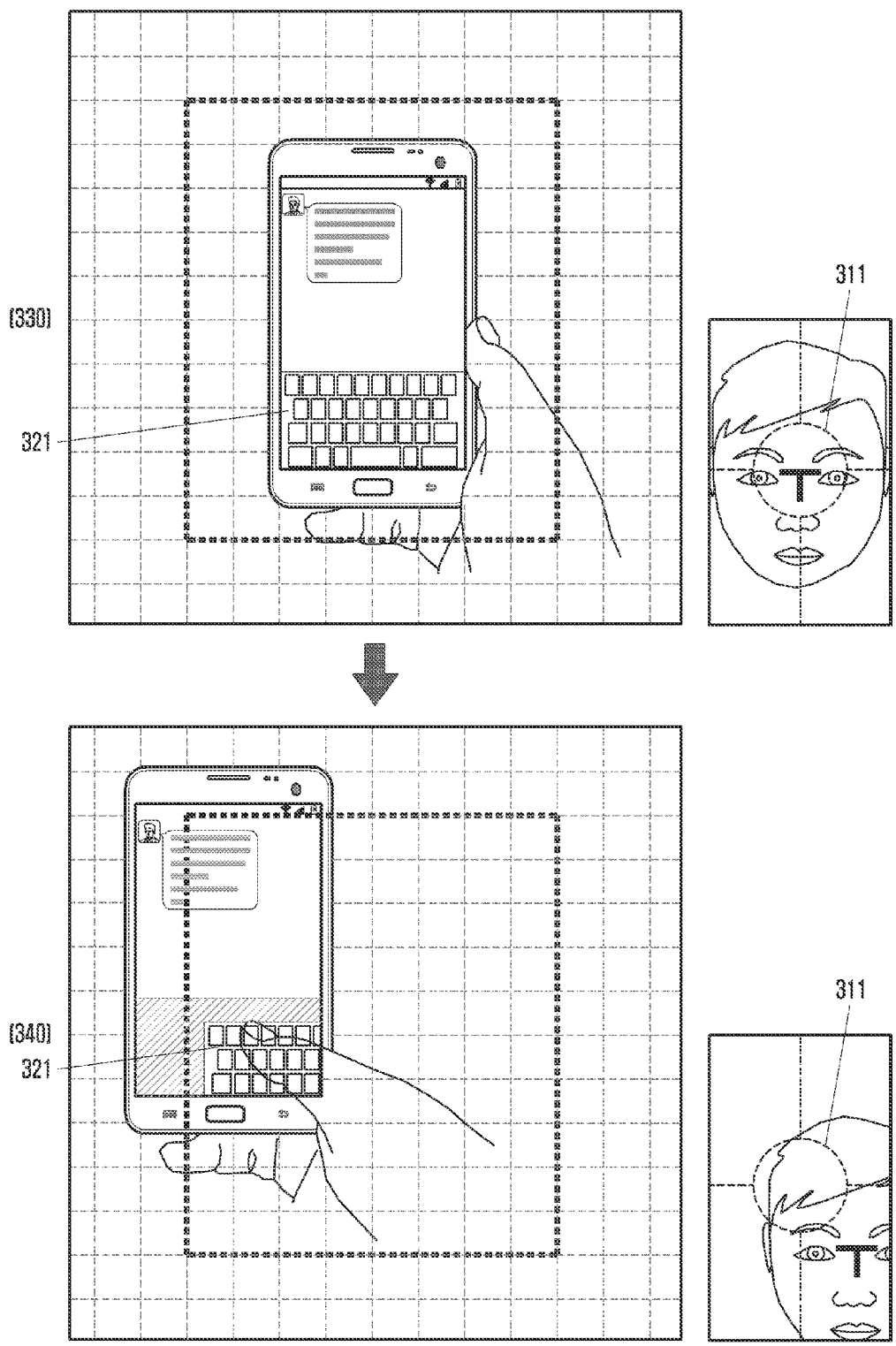
Figure 3C:
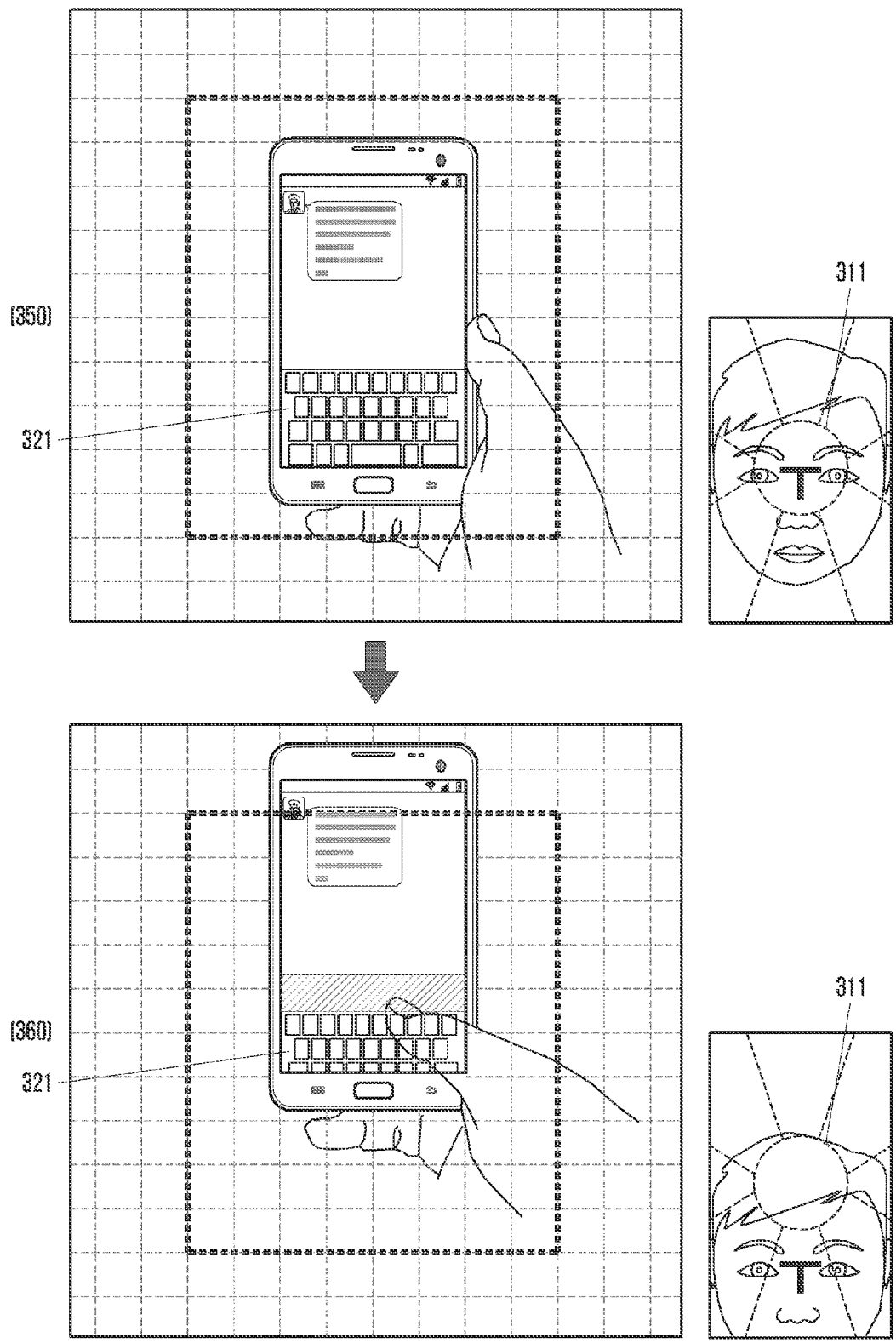
Figure 4A:
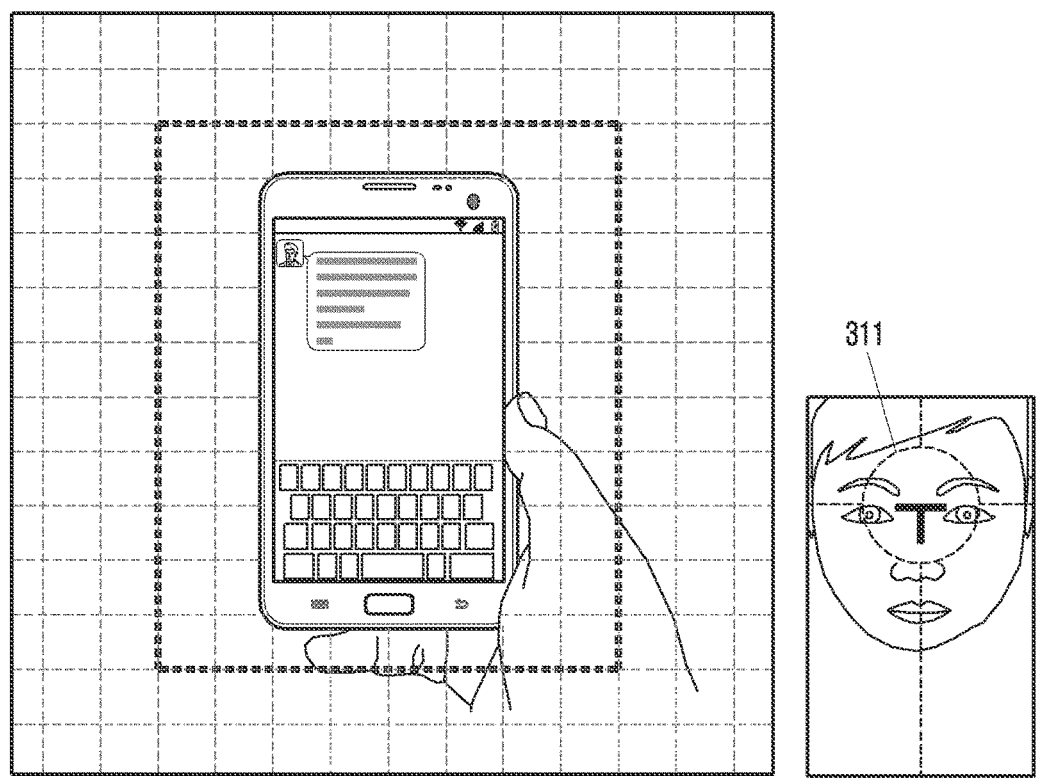
FIGS. 4A and 4B are views showing a setting location of a threshold area according to an embodiment of the present disclosure.
Figure 4B:
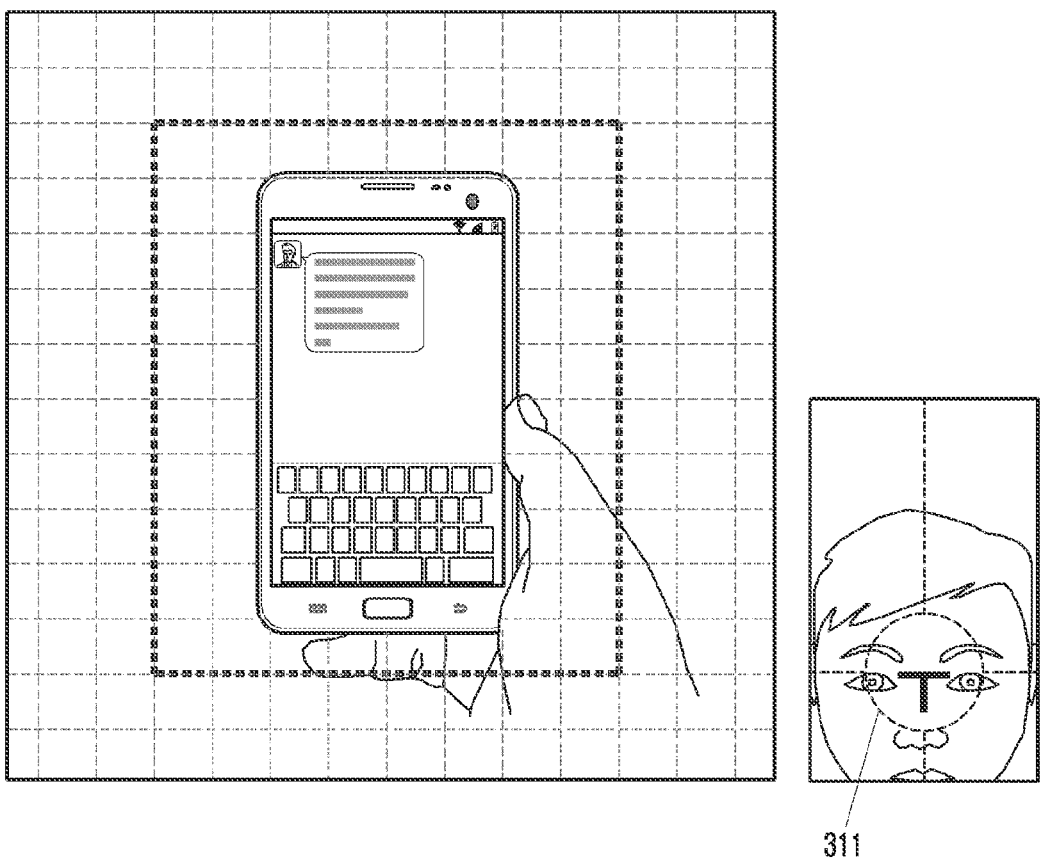
Figure 5:
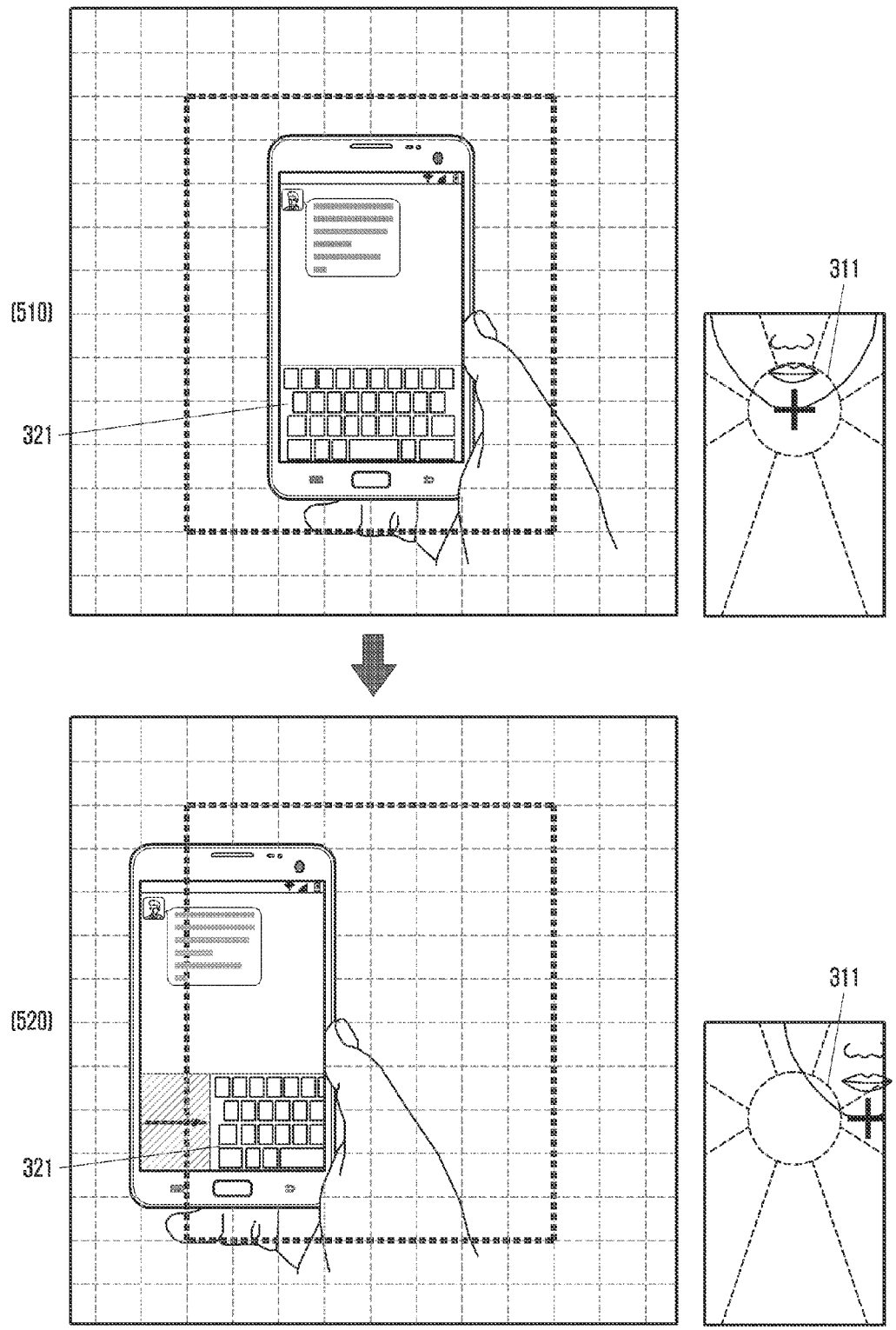
FIG. 5 shows an object setting method according to an embodiment of the present disclosure.
Figure 6:
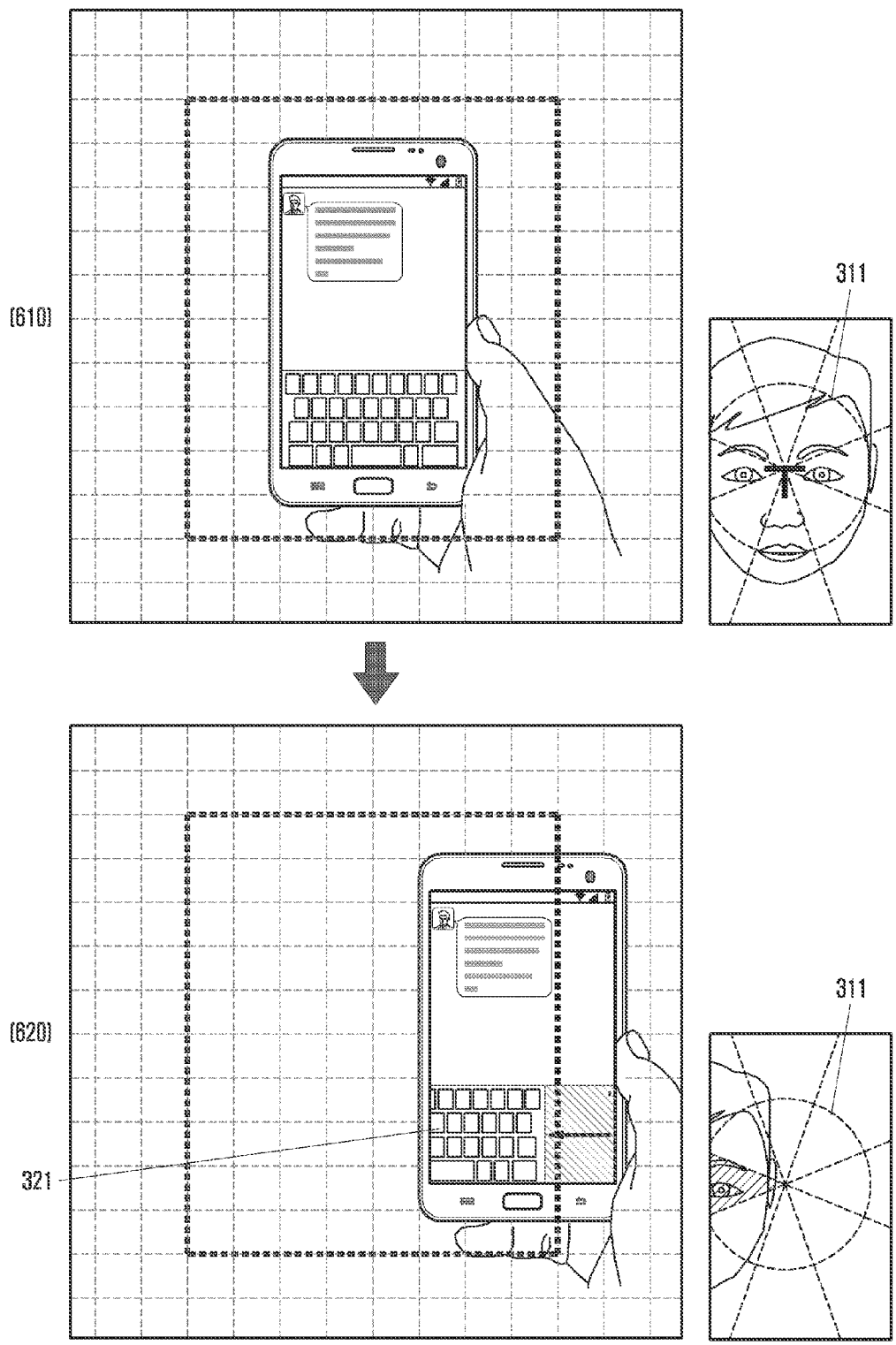
FIG. 6 shows movement of a screen when an object disappears from a photographed image according to an embodiment of the present disclosure.

FIG. 2 is a flowchart showing a screen control operation according to an embodiment of the present disclosure. FIGS. 3A, 3B, and 3C are views showing a method of setting a reference area according to an embodiment of the present disclosure. FIGS. 4A and 4B are views showing a setting location of a threshold area according to an embodiment of the present disclosure. FIG. 5 shows an object setting method according to an embodiment of the present disclosure. FIG. 6 shows movement of a screen when an object disappears from a photographed image according to an embodiment of the present disclosure.

First, the display 120 may display a predetermined screen in operation 205. For example, a letter message application execution screen may be displayed through the display 120.

In operation 210, the controller 150 may execute a screen moving mode. The screen moving mode may be set or released according to a selection of the user. For example, the screen moving mode may select and execute a specific icon, and for example, may execute a specific application. The screen moving mode may be set to be operated only in a situation in which a specific application (for example, a letter message application) is executed or a specific screen (for example, a keypad display screen) is displayed.

If the screen moving mode is executed, the controller 150 may drive the camera 110 and detect a specific object located on the front surface of the camera 110 in operation 215. The camera 110 may include, for example, a camera located on the front surface of the mobile device and a camera located on the rear surface of the mobile device. If the screen moving mode is executed and the camera 110 (for example, the camera located on the front surface of the mobile device) is driven, the face, hair, and clothes of the user may be included in the photographed image. The specific object may be set to a face area (a T-zone (i.e., an area where the forehead and the nose of the user are located), a face contour, and the like) of the user using the mobile device, and in addition, a pattern of the clothes of the user, a pattern of wall paper, a pattern of a ceiling, and an illumination device on the ceiling may be detected as the specific object.

If the specific object is detected, the controller 150 may set a reference area with reference to the object detected in operation 220. The reference area may include a threshold area 311 and a division area. The threshold area 311 is an area which acts as a reference for determining movement of the object, and the controller 150 may determine a movement of the object moved to the outside of the threshold area 311. That is, when the location of the object is moved while the object does not deviate from the threshold area 311, the controller 150 may determine that the object is in a stopped state. The threshold area 311 may collectively set a point of the object based on the location coordinate of the object on the photographed image.

The division area is an area obtained by dividing an external area of the threshold area 311 from the photographed image, and may act as a reference for recognizing a movement direction and a movement location of the object. When the object is moved to a location deviating from the threshold area 311, the controller 150 may trace a location coordinate of the moved object and determine a division area corresponding to the location of the object.

The timing for detecting the object and setting the reference area may be, for example, immediately after the screen moving mode is executed. When the user desires to reset the reference area, the set reference area information may be changed by selecting a specific icon requesting resetting of the reference area. The timing for setting the reference area is a time point when a specific icon for requesting resetting of the reference area is selected. When a power source of the screen is switched on again after being switched off, the controller 150 may recognize a location of the object and reset the reference area. Although it has been described that the reference area including the threshold area 311 is variably set at a specific time point, the present disclosure is not limited thereto, and a coordinate for the reference area including the threshold area 311 may be fixed according to the embodiment of the present disclosure.

If the reference area is set, the controller 150 may determine whether the object (for example, a T zone) is moved to the outside of the threshold area 311 in operation 225. When the object is not moved to the outside of the threshold area 311, that is, when the object is stopped or only movement of the object within the threshold area 311 is detected, the controller 150 may display a screen while maintaining the screen in operation 227.

If the object is moved to the outside of the threshold area 311 in operation 225, the controller 150 may detect a movement direction of the object in operation 230. The controller 150 may move the screen to a screen corresponding to the detected movement direction of the object to display the screen in operation 235. Then, the screen may be moved only with reference to movement direction information irrespective of a movement distance of the object. For example, the screen may be moved only by a preset predetermined distance irrespective of whether the object is moved by a short distance or a long distance when the object is moved from the threshold area 311 to a division area. The movement location of the screen may be moved with reference to not only a movement direction but a movement distance of the object.

The controller 150 may extract a specific object from an image photographed at a specific time point and set a reference area based on a location of the extracted object, and may determine movement and a movement direction of the object based on the threshold area 311 and the division area corresponding to the reference area. Setting of the threshold area 311 and movement of the screen will be described with reference to FIGS. 3A to 6.

FIG. 3A shows an example of setting a reference area while taking the threshold area 311 as the center of the threshold area 311. First, it is assumed that the threshold area 311 of FIG. 3A is fixed to a center coordinate. First, the right picture of 310 of FIG. 3A is a photographed image photographed by the camera 110, and shows a state in which the threshold area 311 and the division area are set. A screen state of the mobile device is shown on the left side of 310. Then, as shown in the right side of 310, the division area of the image photographed by the camera 110 may be set such that a movement direction of the object may be recognized in two ways. In this case, the division area may be set such that the outside of the threshold area 311 is divided into two parts, and a left and right movement of the object may be detected based on the division area. However, the division area set such that the movement direction may be recognized in two ways may be set such that an upward and downward movement as well as a left and right movement of the object may be detected. The object may be set, for example, to a T-zone of the face of the user. However, if the specific object (T-zone) is moved to the outside of the right side of the threshold area 311, that is, the mobile device is horizontally moved to the left side, the controller 150 may move the screen of the display 120 to the right side to display the screen. Reference numeral 320 shows that the keypad 321 displayed in an area of the screen is moved to the right side of the screen.

Reference numeral 330 of FIG. 3B shows that the division area is set such that the external area of the threshold area 311 is divided into four parts. A T-zone which is an object is located within the threshold area 311, and the screen of the mobile device displays an original screen. The original screen refers to a state of the screen before entry into the screen moving mode, and refers to a state in which no movement of the screen is detected. However, as the T-zone which is an object is moved to the lower right side as in 340, the keypad 321 of the screen displayed on the mobile device may be moved to the lower right side to be displayed. If the reference coordinate is set such that movements in four directions may be recognized as in FIG. 3B, the keypad 321 on the screen also may be moved in four directions to be displayed. The four directions may be, for example, the upper right side, the lower right side, the upper left side, and the lower right side.

350 of FIG. 3C shows that the reference coordinate is set such that the outside of the threshold area 311 is divided into eight parts. As the T-zone which is an object is moved to the lower side as in 360, the keypad 321 of the screen displayed on the mobile device also may be moved to the lower side to be displayed. If the reference coordinate is set such that movements in eight directions may be recognized as in FIG. 3C, the keypad 321 on the screen also may be moved in eight directions to be displayed. The eight directions may be, for example, the upper side, the lower side, the left side, the right side, the upper right side, the lower right side, the upper left side, and the lower left side.

FIGS. 4A and 4B show that a setting location of the threshold area 311 may be varied according to a detection location of the specific object (for example, a T-zone). First, FIG. 4A shows that when the T-zone of the user is detected in the upper area of the photographed image, the threshold area 311 also may be formed in an area above the center thereof. Meanwhile, FIG. 4B shows that when the T-zone of the user is detected in an area below the photographed image, the threshold area 311 also is formed in a lower area. In this way, the location of the threshold area 311 may be fixed, but may be varied according to the detected location of the specific object.

FIG. 5 shows that a jaw of the user is detected as an object by the front camera. In this way, a target of a specific object detected by the camera 110 may include a pattern of a jaw, a lip, or clothes as well as the T-zone of the face of the user. A priority may be set for the target set as the object. If the priority of the specific target is set for setting of the object, a specific item (for example, a T-zone) of which a priority is set when a reference area is set may be extracted from the photographed image first. Reference numeral 510 shows that a threshold area 311 is set at a location of the jaw as the camera 110 detects the jaw of the user. Reference numeral 520 shows that a location of the jaw of the user set as an object is moved to a right area outside the threshold area 311, and accordingly, the keypad 321 of the screen is moved to the right side. In this way, if it is determined that a location of the jaw which is an object is moved to the right side, the controller 150 may display a specific screen (for example, a keypad) after the location of the specific screen is moved to the right side.

Reference numeral 610 of FIG. 6 shows that the size of the threshold area 311 is set to be large as a distance between the device and the object is small. Reference numeral 620 shows that the object (T-zone) deviates from a camera angle in a process in which the camera 110 monitors the object (T-zone). When the object (T-zone) disappears from the photographed image as shown in 620, the controller 150 may determine that the object is moved to the outside of the threshold area 311. An internal area of the threshold area 311 may be divided into a predetermined number (for example, eight) of parts to detect a movement direction of the object. As shown in the left picture of reference numeral 620, the keypad 321 of the screen may be moved to the left side in correspondence to the movement direction of the detected object.

As described above, the controller 150 may set a threshold area 311, and may move the screen to a location corresponding to the movement of the object to display the screen in various methods.

Returning to FIG. 2, after the screen is moved in correspondence to the detected movement direction, the controller 150 may determine whether the object is moved into the threshold area 311 again in operation 240. If the object is not moved into the threshold area 311, operation 250 may performed directly. However, when the object is moved into the threshold area 311, the controller 150 may display an original screen in operation 245. The original screen refers to a screen in a state in which no screen is moved. In operation 250, the controller 150 may determine whether the screen moving mode is completed. When the screen moving mode is not completed, the controller 150 may determine whether the object is moved to the outside of the threshold area 311 in operation 225. However, when it is determined that the screen moving mode is completed, all the processes of FIG. 2 may be ended.

Figure 7B:
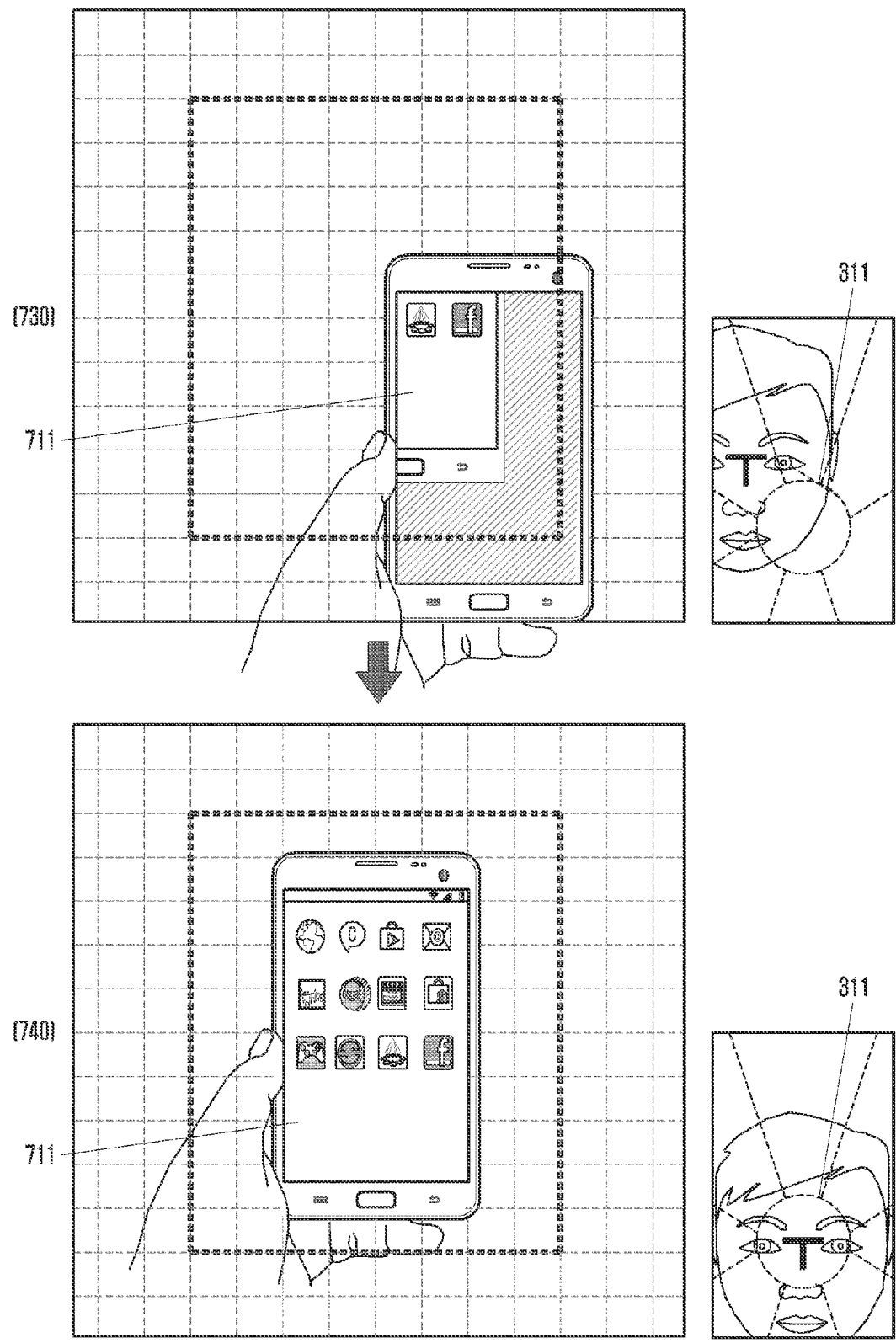
Figure 8:
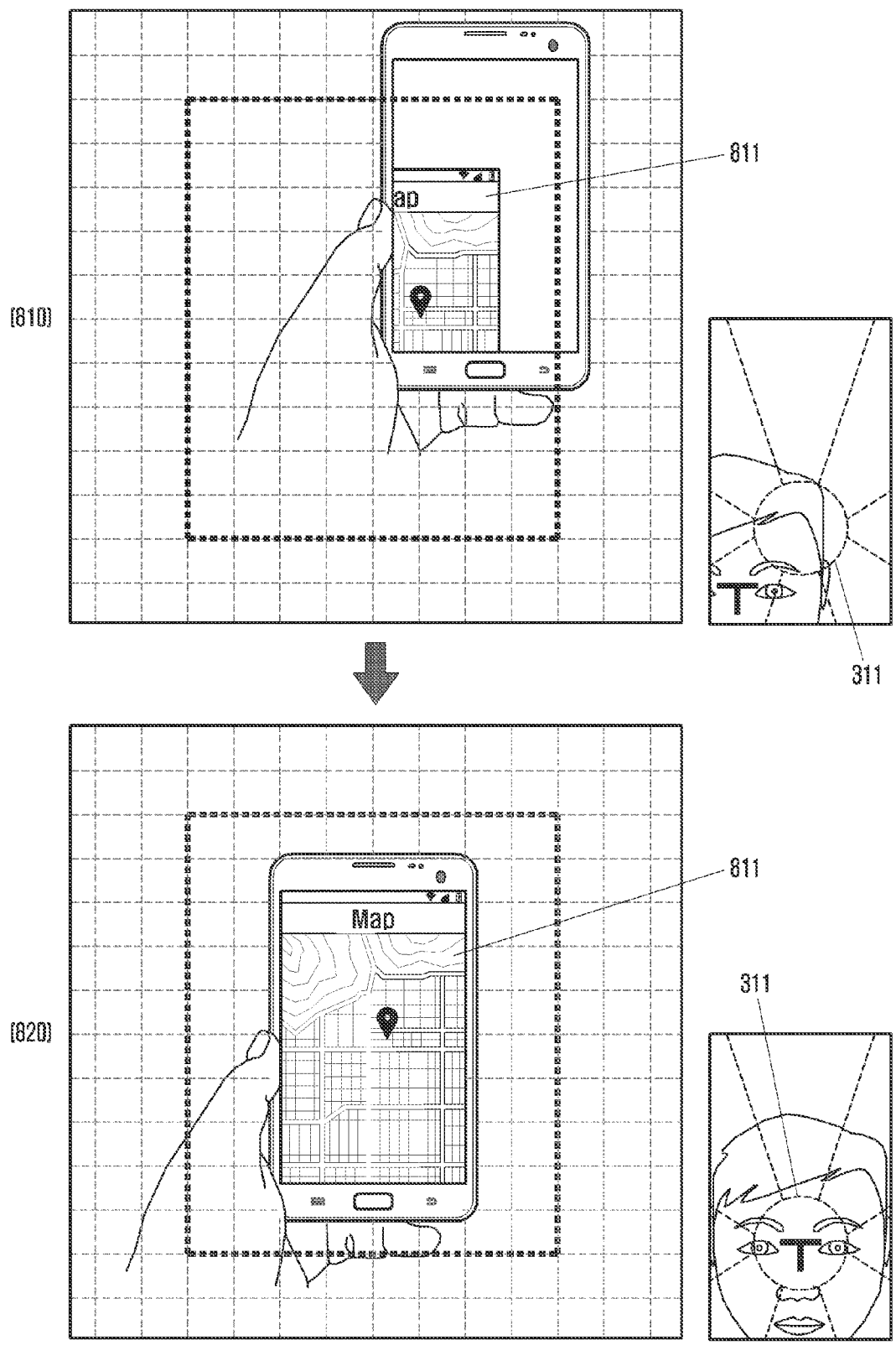
FIG. 8 shows movement of a screen on which a webpage is displayed according to an embodiment of the present disclosure.
Figure 9:
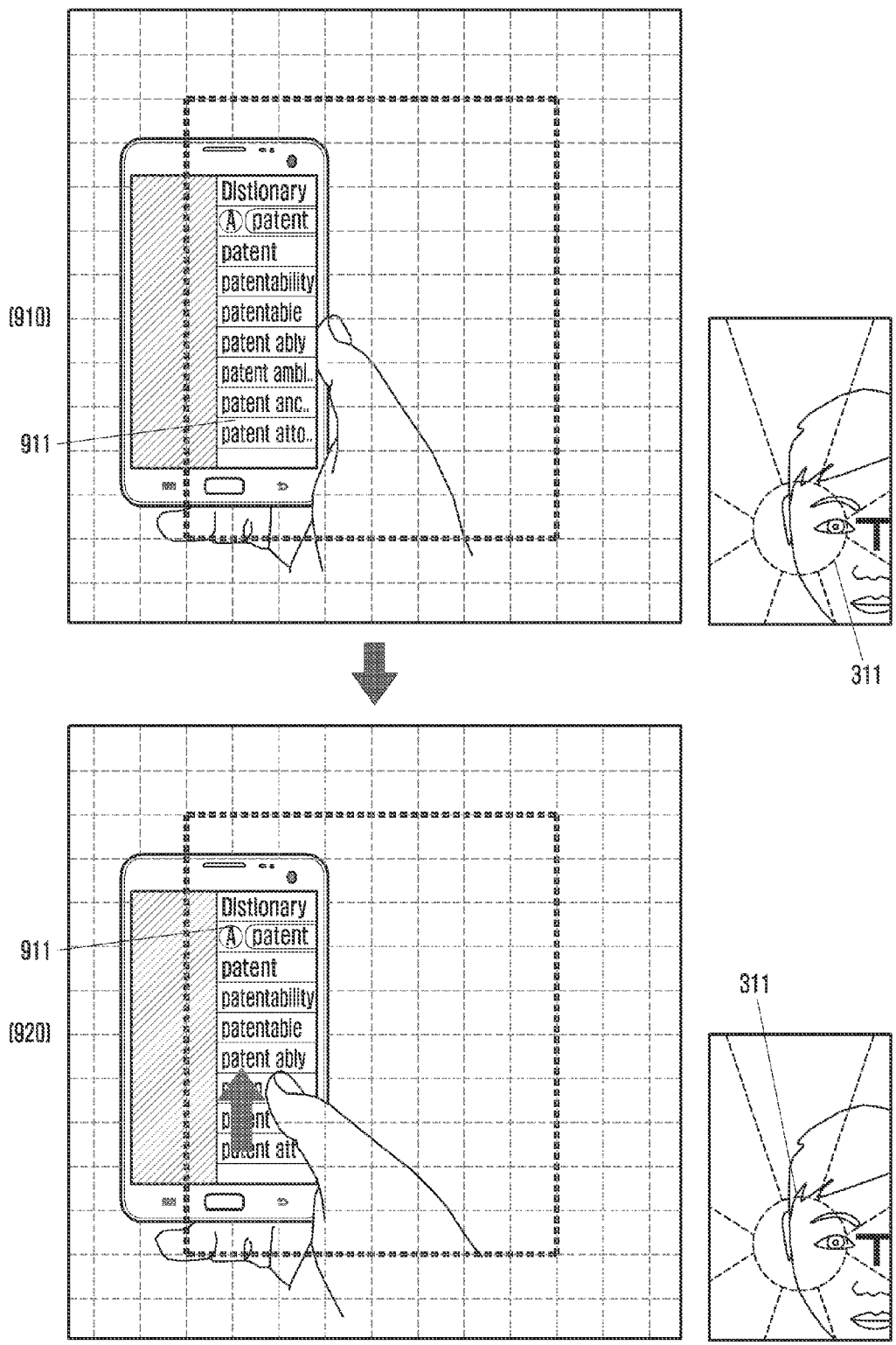
FIG. 9 shows that an operation is performed by using a touch gesture on a moved screen according to an embodiment of the present disclosure.

Hereinafter, movement of various types of screens will be described with reference to FIGS. 7A to 9. First, FIGS. 7A and 7B show movement of a home screen according to an embodiment of the present disclosure. FIG. 8 shows movement of a screen on which a webpage is displayed according to an embodiment of the present disclosure. FIG. 9 shows that an operation is performed by using a touch gesture on a moved screen according to an embodiment of the present disclosure.

Reference numeral 710 of FIG. 7A shows that a home screen 711 is displayed on the display 120 of the mobile device. Reference numeral 710 shows that the T-zone of the face of the user is set as an object. Reference numeral 710 shows that the outside of the threshold area 311 is divided into eight parts. Reference numeral 720 shows that the T-zone which is an object is moved to the lower left side of the external area of the threshold area 311. Accordingly, it is also shown that the home screen 711 of the mobile device is moved to the lower left side. In this way, if movement of a specific object existing in the threshold area 311 to a specific point outside the threshold area 311 is detected, the controller 150 may move the entire screen in correspondence to the side to which the specific object is moved.

FIG. 7B shows that the moved home screen 711 is moved again. First, reference numeral 730 shows that the T-zone which is an object is moved to the upper left side of the outside of the threshold area 311, and accordingly, it is shown that the home screen 711 of the mobile device is moved to the upper left side. Reference numeral 740 shows that the object on the upper left side is moved into the threshold area 311 again. Accordingly, the home screen 711 moved to the upper left side is moved to the original location again. The movable screen in the screen moving mode may be the entire screen such as the home screen 711 as well as the specific area (for example, the keypad area). In addition, the screen of the specific webpage and the application execution screen may be moved to be displayed as the object is moved.

Reference numeral 810 of FIG. 8 shows that the location of the screen is moved as the object is moved on the webpage 811 on which a map is searched for. In reference numeral 810, the object is located on the lower left side of the outside of the threshold area 311, and accordingly, it is shown that the webpage 811 also is moved to the lower left side in the mobile device. In this state, if the object is moved into the threshold area 311 again as in 820, the mobile device displays the original screen before the screen is moved. That is, even in a situation in which the webpage 811 is displayed, the controller 150 may control such that the original screen is displayed if the specific object moved to the outside of the threshold area 311 is moved into the threshold 311 again.

In the embodiment of the present disclosure, because a specific touch gesture is not required for movement of the screen, an arbitrary touch gesture (for example, a drag) may be freely used in the moved screen. Reference numeral 910 of FIG. 9 shows that when the object is moved to the right side of the outside of the threshold area 311, an execution screen 911 of an arbitrary application (for example, a dictionary application) is moved to the right side by a predetermined distance. Reference numeral 920 shows that a scroll operation is performed through execution of a touch gesture (for example, a drag) of the user in the moved screen.

Meanwhile, the various embodiments of the present disclosure as described above may be implemented in the form of a program instruction that can be performed through various computers, and may be recorded in a non-transitory computer readable recording medium. The non-transitory computer readable recording medium may include a program command, a data file, and a data structure independently or in combination. The program instruction recorded in the non-transitory recording medium is specially designed and constructed for the present disclosure, but may be well known to and may be used by those skilled in the art of computer software.

The non-transitory computer readable recording media may include a magnetic media such as a hard disc, a floppy disc, and a magnetic tape, an optical recording media such as a Compact Disc Read Only Memory (CD-ROM) and a Digital Versatile Disc (DVD), a magneto-optical media such as a floptical disk, and a hardware device, such as a Read Only Memory (ROM), a Random Access Memory (RAM), and a flash memory, specifically configured to store and execute program instructions. Further, the program command includes a machine language code generated by a compiler and a high-level language code executable by a computer through an interpreter and the like. The hardware device may be configured to operate as one or more software modules in order to perform operations of the present disclosure, and vice versa.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling a screen of a mobile device, the method comprising:
    displaying a screen on a display of the mobile device;
    detecting an object through an image sensor;
    setting, as a reference point, at least one part of the detected object;
    setting a reference area based on the reference point, wherein the reference area comprises a threshold area and a division area by dividing an outside area of the threshold area into two or more areas;
    determining whether the mobile device is moved by determining whether the reference point is moved out of the threshold area; and
    if the mobile device is moved, moving the displayed screen on the display to a location corresponding to the division area to which the reference point is moved.

2. The method of claim 1, wherein the setting of the reference area comprises:
    setting the threshold area comprising the location of the detected object; and
    setting the division area by dividing an outside area of the threshold area into two or more areas.

3. The method of claim 2, wherein the setting of the threshold area comprises one of setting a location of the threshold area by varying the location of the threshold area, and fixing the location of the threshold area.

4. The method of claim 2, wherein in the setting of the division area, a number of the divided areas is variable.

5. The method of claim 1, wherein the detecting of the object comprises:
    dividing, if the object is moved to a location deviating from a photographing range, the entire photographed image into two or more areas;
    tracing a location coordinate before the object is moved to outside the screen of the display; and
    detecting the division area corresponding to the location coordinate.

6. The method of claim 1, wherein the moving the displayed screen on the display comprises that either the entire area of the displayed screen on the display is moved or a partial area of the displayed screen on the display is moved.

7. A non-transitory computer readable recording medium having a program recorded thereon to implement the method of claim 1.

8. An apparatus for controlling a screen of a mobile device, the apparatus comprising:
    an image sensor configured to detect an object;
    a display configured to display the screen on the display; and
    a controller configured to:
        set at least one part of the detected object as a reference point,
        set a reference area based on the reference point, wherein the reference area comprises a threshold area and a division area,
        determine whether the mobile device is moved by determining whether the reference point is moved out of the threshold area, and
        if the mobile device is moved, control to move the displayed screen on the display to a location corresponding to the division area to which the reference point is moved.

9. The apparatus of claim 8, wherein the controller comprises an object setting unit for detecting the object from an image captured by the image sensor.

10. The apparatus of claim 8, wherein the controller comprises a reference area setting unit for setting the reference area based on the location of the reference point.

11. The apparatus of claim 10, wherein the reference area setting unit varies a location of the threshold area or sets the threshold area at a fixed location according to the location of the detected object.

12. The apparatus of claim 8, wherein, if the object is moved to a location deviating from a photographing range, the controller divides the entire image into two or more areas, traces a location coordinate before the object is moved to outside the screen, and detects the division area corresponding to the location coordinate.

13. The apparatus of claim 8, wherein the display moves one of an entire area of the displayed screen of the display or a partial area of the displayed screen of the display.

\* \* \* \* \*